Aug. 4, 1953 J. F. HAVERLIN 2,647,708
CONTROL FOR THE LANDING GEAR OF AIRCRAFT
Filed Sept. 14, 1950 2 Sheets-Sheet 1
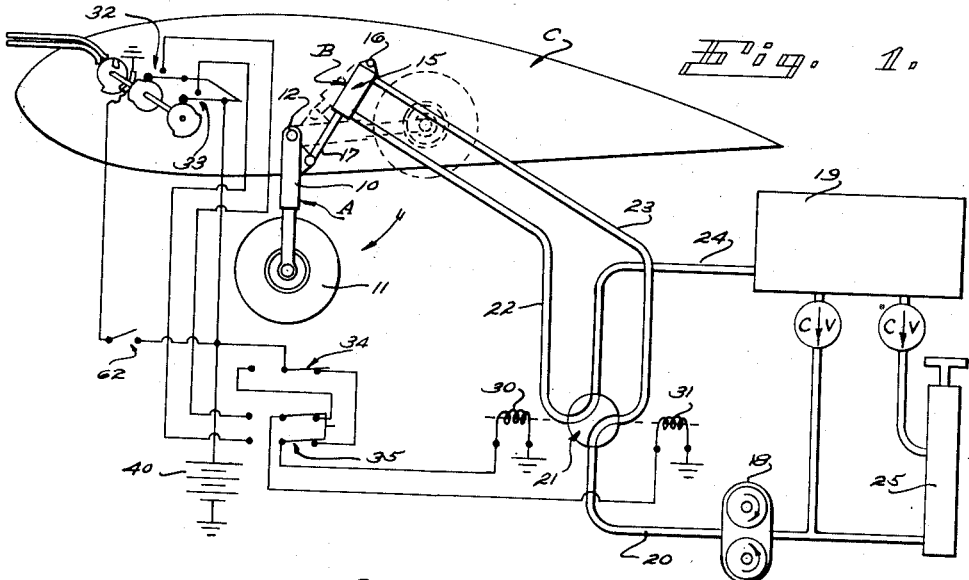
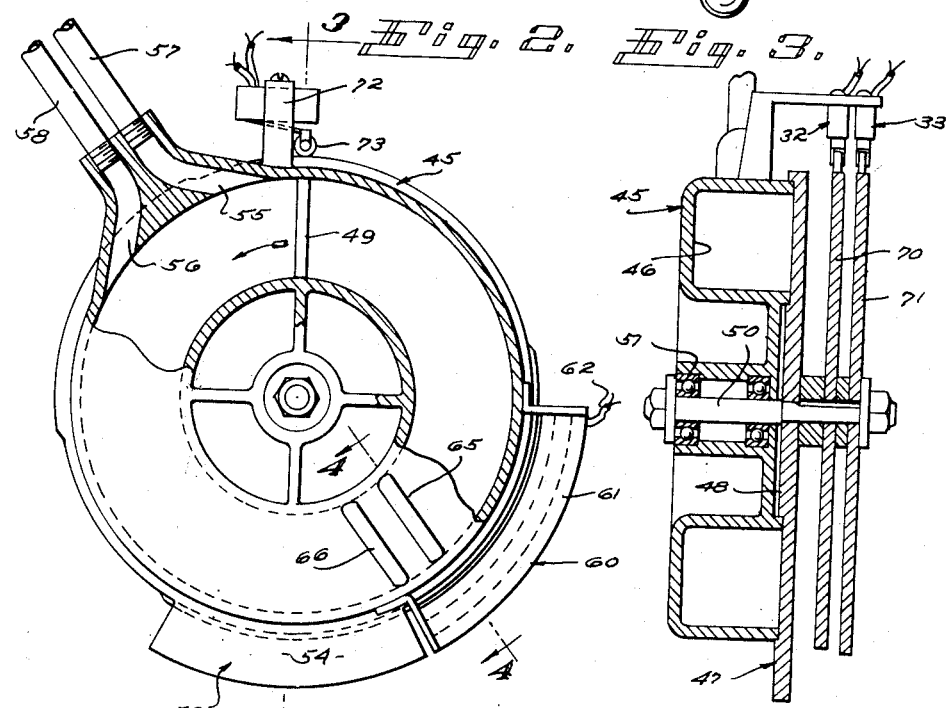
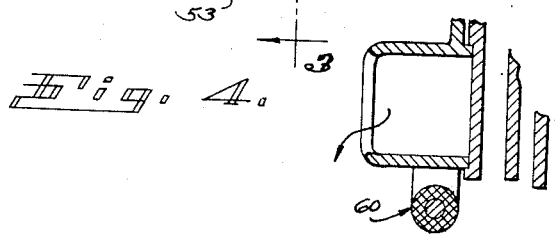
INVENTOR.
Jack F. Haverlin
BY
Attorney Aug. 4, 1953
J. F. HAVERLIN
2,647,708
CONTROL FOR THE LANDING GEAR OF AIRCRAFT
Filed Sept. 14, 1950
2 Sheets-Sheet 2
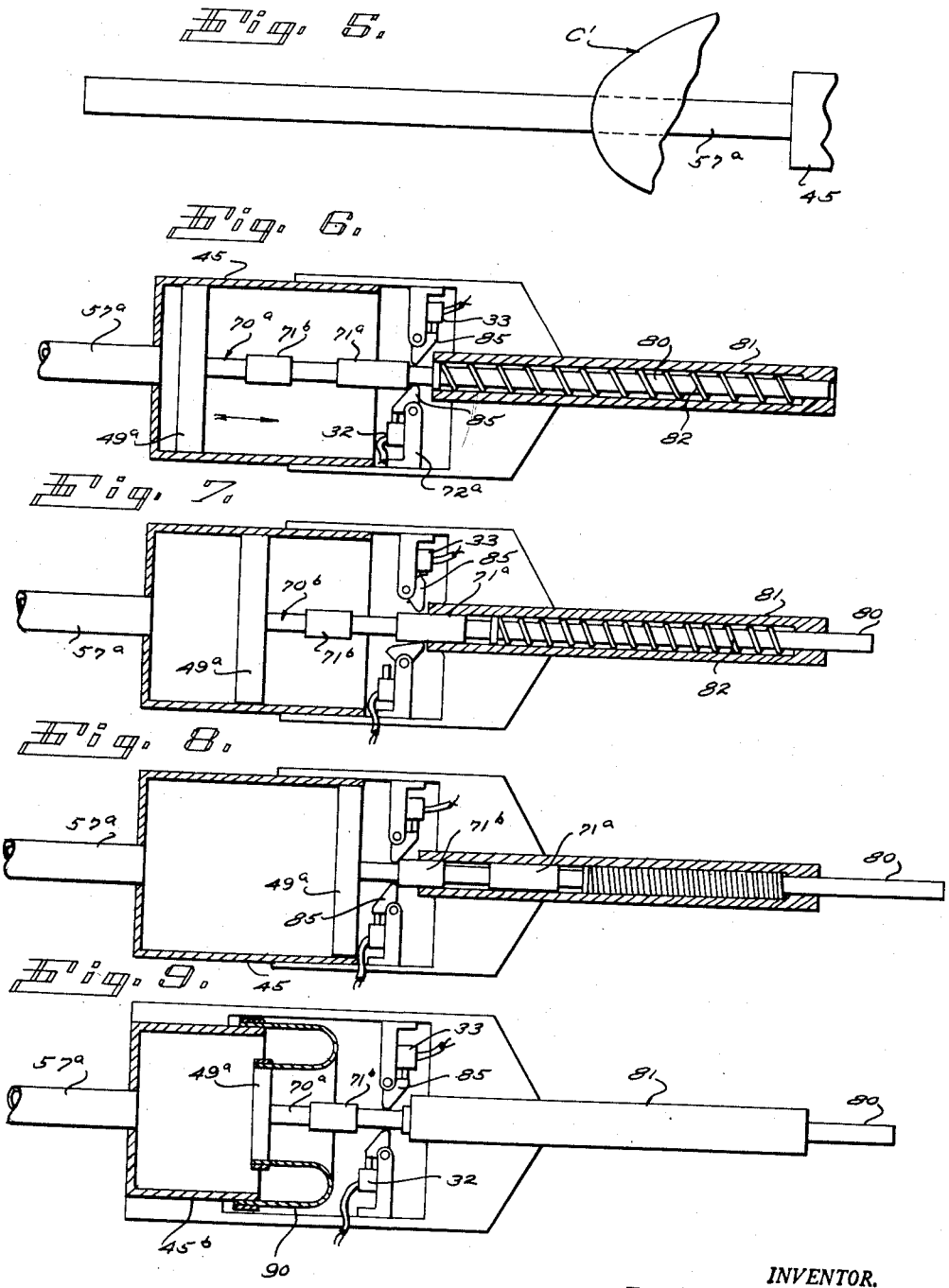
INVENTOR.
Jack F. Haverlin
BY
Attorney Patented Aug. 4, 1953

2,647,708

UNITED STATES PATENT OFFICE 2,647,708

CONTROL FOR THE LANDING GEAR OF AIRCRAFT

Jack F. Haverlin, Northridge, Calif., assignor to Haverlin Aviation Products, Inc., Northridge, Calif., a corporation of California Application September 14, 1950, Serial No. 184,835

11 Claims. (Cl. 244—102)

This invention is concerned with a control for the landing gear of aircraft and it is a general object of the invention to provide a simple, practical, dependable control, serving to operate, that is, both to lower and to retract, landing gear in such manner as to insure the presence of the landing gear in operating position when the craft is operating at speeds at which take-offs or landings can be made.

The landing gear of the ordinary heavier-than-air machine or airplane is a retractable device equipped with operating means generally under control of the pilot so that the gear can be retracted after the machine is in the air and can be lowered preliminary to making a landing. Modern aircraft of the type referred to are highly involved machines and the operation or managing of the landing gear is a critical or highly important operation which requires attention of the operator or pilot and thus serves to add to the general complicated operations required during take-offs and landing. It is a general object of this invention to provide a control for landing gear which may, if so desired, be manually operated in the manner usual to aircraft but which is capable of operating in response to the speed of the machine so that the landing gear is down or in operating condition when the machine is operating at speeds suitable for take-offs or landing, and is retracted whenever the machine is operating at speeds in excess of those employed during take-offs or landing.

The present invention is intended for application to an airplane of the heavier-than-air type, and, for example, it may be considered applied to landing gear equipped for operating means such as fluid pressure actuated means which is under control of a valve.

The present invention provides a control system by which the control valve of the control system is operated by or through cam means operated by a pneumatic actuator. The control system is preferably characterized by solenoids for operating the control valve, the solenoids being in a circuit including power actuated solenoid switches, a manually operated solenoid switch and a selector switch. Through operation of the selector switch the circuit can be conditioned either for manual operation or for operation in response to the cam means. The cam means is related to the solenoid switches and is operated by the pneumatic actuator so that one solenoid switch is actuated or determines the position of the control valve when the machine is operating at what may be termed low speed while the other solenoid switch controls or determines the position of the control valve when the machine is operating at high speed. The invention contemplates incorporation of the cam means and pneumatic actuator in a rotary mechanism involving various unique features of construction and operation or in a reciprocating mechanism through which a highly practical dependable and effective action is gained.

A general object of the present invention is to provide a control of the general character referred to which is dependable and effective in operation and is free of complicated or delicate parts requiring adjustment or which are likely to fail or become inoperative. The mechanism provided by the invention involves few simple working parts, all of which are such that they may be so constructed as to be rugged and dependable.

Another object of the invention is to provide a control of the general character referred to which can be so set or engaged as to operate wholly without care or attention on the part of the pilot or operator of the machine.

The various objects and features of my invention will be fully understood from the following detailed description of typical preferred forms and applications of the invention, throughout which description reference is made to the accompanying drawings, in which:

Fig. 1 is a diagrammatic view illustrating, generally, the invention applied to a simple or typical landing gear occurring on an airplane, the selector switch of the control system being shown set for manual operation of the system and the manually operated switch being shown closed or in position so that the landing gear is down. Fig. 2 is an enlarged view of the control showing parts broken away to illustrate details of construction. Fig. 3 is a detailed sectional view taken as indicated by line 3—3 on Fig. 2. Fig. 4 is a detailed sectional view taken as indicated by line 4—4 on Fig. 2. Fig. 5 is a view illustrating a portion of an airplane showing an air receiving tube related thereto. Fig. 6 is a longitudinal sectional view of a form of mechanism that may be employed in carrying out the invention and showing the mechanism unactuated. Fig. 7 is a view similar to Fig. 6 showing the mechanism partly operated. Fig. 8 is a view similar to Figs. 6 and 7 showing the mechanism fully actuated and Fig. 9 is a view showing another form of construction that may be employed, illustrating such construction in a partially actuated position.

The present invention is applicable, generally, to aircraft and since it is particularly practical as applied to heavier-than-air machines, or airplanes, it will be referred to in that connection. Further, it is to be understood that the invention can be used in connection with or applied to landing gear of various types or constructions and it may be employed to control various forms or types of operating means for landing gears.

In the present disclosure and for purpose of illustration I have illustrated a simple type of landing gear A and have shown operating means B for the gear A as a fluid pressure actuated means or hydraulic mechanism. In the diagram of Fig. 1 I have illustrated the gear A diagrammatically related to a suitable element C of the aircraft and although various elements are illustrated as remote from or on the exterior of the element C it is to be understood that in practice, the invention may be carried out in small, compact, or more or less self-contained units that can be embodied in or applied to aircraft without encumbering or complicating them to any appreciable extent.

The particular landing gear A illustrated in Fig. 1 involves a shiftable element 10 carrying a landing wheel 11. The element 10 is shown mounted to swing about a pivotal axis 12 and it may be moved between a down or operating position, such as is shown in full lines, and a retracted or up position such as is indicated in dotted lines.

The operating means B for the gear A being illustrated as a hydraulic means, is characterized, generally, by a cylinder and piston unit 15 anchored to the aircraft as at 16 and having a projecting rod 17 coupled to the element 10 and the gear A. A pressure generator or pump 18 receives operating fluid from a suitable reservoir 19 and delivers it under pressure to a supply line 20. A control valve 21 receives fluid from supply line 20 and delivers it to cylinder lines 22 and 23 and exhausts it to a return line 24. Cylinder line 22 extends from valve 21 to one end of the unit 15 while line 23 extends from the valve 21 to the other end of unit 15. The return line 24 is an exhaust line extending from the valve 21 to the reservoir 19.

In the particular case illustrated an auxiliary pressure generator or hand-pump 25 is shown suitably coupled in the hydraulic system so that pressure can be established in the system in the event that the power driven pump 18 should fail. From the diagram Fig. 1, it will be apparent that the valve 21 has two positions and in one position it supplies fluid under pressure to line 23 while in the other position it supplies fluid under pressure to line 22.

The control system provided by the present invention includes electric operating means for valve 21. In the case illustrated this means includes solenoids 30 and 31. It will be understood that the solenoids may be coupled or related to the valve 21 in any suitable manner so that the valve is in one position when one of the solenoids is energized and is in the other or opposite position when the other solenoid is energized.

The electric circuit provided for controlling the solenoids 30 and 31 is characterized by power actuated switches 32 and 33. The switch 32 when closed, results in energization of solenoid 31 positioning valve 21 so that the gear A is lowered. When switch 33 is closed solenoid 30 is energized causing the valve 21 to be positioned so gear A is lifted.

The control system further inculdes a manually operated switch 34 and a selector switch 35. The selector switch is shown as a two-poled-double-throw switch, which, when closed in one position, as shown in Fig. 1, closes a circuit through the manually operated switch 34. When switch 35 is in the other or opposite closed position it closes the circuit so the system is under control of switches 32 and 33. The switch 34 is a two-way switch and when closed in one position it completes a circuit through solenoid 30 as shown in Fig. 1 and when in the other or opposite closed position it closes a circuit through solenoid 31, assuming of course, that the selector switch 35 is positioned as shown in Fig. 1.

In the diagram Fig. 1 the various switches above referred to are shown suitably connected in an electric system that may be energized by or from any suitable source of energy. The particular system illustrated is a simple system energized by a battery 40. The circuit has one pole or side grounded through suitable ground connections.

The present invention provides, generally, cam means for operating the power actuated switches 32 and 33 and it provides a pneumatic actuator for the cam means. In accordance with the principles of the invention the cam means in the pneumatic actuator may be varied widely in form and construction. To illustrate variations of these elements of the invention I have on sheet one of the drawings illustrated what may be referred to as a rotary type of mechanism wherein the cam means involves revolving or rotating cam parts while the pneumatic actuator involves a rotating construction coupled with or serving to drive the cam parts. On sheet two of the drawings I illustrate what may be referred to as a reciprocating type of mechanism in which case the desired cam actuation is gained by reciprocatory motion and the pneumatic actuator is a reciprocating mechanism.

Referring to the cam means and pneumatic actuator shown on sheet one of the drawings, the pneumatic actuator includes a case 45 defining an annular chamber 46 and a rotor 47 having a pivotally mounted plate 48 closing the chamber. The plate carries a blade 49 which operates in the chamber 46. The plate 48 is shown carried on a spindle 50 carried by anti-friction bearings 51 supported by the case 45 concentric with the chamber 46. The plate closes the open side of chamber 46 as shown in Fig. 3 and the blade 49 projects from the plate 48 to act as a paddle or partition which operates around and within the chamber 46 about the axis of the spindle 50.

A suitable means 53 is provided to normally position the rotor 47 relative to the case 50 so that blade 49 normally assumes a predetermined rotative position in chamber 46. In the case illustrated it is intended that the pneumatic actuator be arranged so that the axis of the rotor 47 is horizontally disposed in which case the means 53 may be a gravity actuated means. In the drawings, the means 53 is shown as including a weight 54 on the periphery of plate 48 and the blade 49 is located diametrically opposite the weight 54 so that when the mechanism is in the normal unactuated position the weight 54 is down and the blade 49 is up.

Circumferentially spaced air inlet ports 55 and 56 are provided in the periphery of the case 45 and in the case illustrated they are circumferentially spaced somewhat in a counter-clockwise direction from the blade 49 when the blade is unactuated as shown in Fig. 2.

Air supply tubes 57 and 58 are connected with the case 45 to supply air to the ports 55 and 56, respectively. The tubes 57 and 58 extend to the exterior of the aircraft where they have forwardly facing open ends that receive air as the aircraft advances.

A starter 60 is provided in connection with the mechanism just described and serves to initiate rotation or operation of the rotor 47 in a counter-clockwise direction. In the particular case illustrated the starter is an electromagnetic means involving a coil or winding 61 under control of a manually operated switch 62 and is located circumferentially in a counter-clockwise direction from the weight 54 when the weight is unactuated as shown in Fig. 2. When the coil 61 is energized a magnetic field is established and the weight, which is formed of magnetic material such as a ferrous metal, is drawn into the field and is thus moved in a counter-clockwise direction.

The various parts are arranged and proportioned so that when the coil 61 is energized the rotor 47 is operated so the blade 49 is moved past the ports 55 and 56 with the result that air introduced into the chamber 46 acts on the blade 49 in a manner to move the rotor in a counter-clockwise direction. Exhaust ports 65 and 66 are located diametrically opposite the ports 55 and 56 so that air flowing into the chamber 46 and acting on the blade 49 to turn the rotor, flows through the chamber 46 and finally exhausts or issues from the chamber through the ports 55 and 56. The ports 65 and 66 are circumferentially spaced and when the rotor is fully operated by air through the action just described, the blade 49 assumes a position in the chamber 46 where it occurs between the exhaust ports 65 and 66 in which case air flows in both directions through chamber 46 maintaining the rotor with the blade between the ports 65 and 66 and with the weight diametrically opposite the blade, or in a position where it is moved past a top or uppermost position and has started down in a counter-clockwise movement.

When air flows or air pressure drops or is no longer such as to hold the parts with the blade between ports 65 and 66 the weight 54 acts, or is acted upon by gravity, causing the rotor to operate or turn in a counter-clockwise direction and will finally bring the rotor to the normal unactuated position where the blade 49 is up and the weight 54 is down as shown in Fig. 2.

The rotary cam means provided to be operated by the rotary pneumatic actuator just described is shown as including cams 70 and 71 operated by or with the rotor 47. In the preferred arrangement the cams 70 and 71 are fixed on the spindle 50 which carries the rotor 47 and the switches 32 and 33 are mounted on the case 45, as by means of a bracket 72, so they are operated by cams.

Assuming the aircraft to be started from the ground with the landing gear A actuated or down, switch 62 is closed which energized the starter 60. As above described energization of the starter 60 turns the rotor until blade 49 has passed ports 55 and 56. When the craft has gained such speed as to take off from the ground, air introduced through the tubes 57 and 58 causes the rotor to continue in the counter-clockwise movement and results in operation of switch 33 by cam 71 so that solenoid 30 is energized and valve 21 is positioned so that unit 15 operates to lift or retract the gear A. When the rotor finally reaches a position where blade 49 is between ports 65 and 66 the cams are positioned so that both switches 32 and 33 are open. When the aircraft is coming in for a landing and has reduced speed to approach a landing speed the air introduced through tubes 57 and 58 will no longer resist the tendency of weight 54 to rotate the rotor in a counter-clockwise direction and consequently the blade 49 moves counter-clockwise from the ports 65 and 66 toward the position shown in Fig. 2 during which operation cam 70 closes switch 32. When switch 32 is closed solenoid 31 is energized and valve 21 is positioned so that unit 15 is operated to lower the gears A.

In the form of the invention shown on sheet two of the drawings, the pneumatic actuator as shown in Figs. 5 to 8 inclusive, involves a cylindrical case 45ª and the member which operates in the case, instead of being a blade, is a head 49ª. A single air tube 57 is open ended and projects forward from the aircraft C' so that air is introduced into the case 45ª and tends to move the head 49 rearwardly or in the direction indicated by the arrow in Fig. 6. A cam member 70ª, elongate in form, is fixed to head 49ª and operates therewith, and relative to switches 32 and 33 carried by the case through brackets 72ª. An extension 80 of the cam member is carried by a guide 81 projecting from case 45ª and a helical spring 82 surrounds extension 80 and normally yieldingly holds the extension 80 in a forward position where the cam member and head are in the forward position as shown in Fig. 6.

The cam member 70ª has longitudinally spaced cam projections 71ª and 71ᵇ which operate the switches 32 and 33 through pivoted trip members 85. The trip members 85 are positioned as shown in the drawings so that the cam parts operate or close switch 33 controlling lifting of the landing gear only as the head is moved rearwardly or in the direction of the arrow in Fig. 6 while switch 32 is closed only as the head moves in the opposite direction. In the preferred arrangement the cam projections 71ª and 71ᵇ are spaced apart along cam member 70ª so that switch 32 is closed or operated twice as the head moves from the position shown in Fig. 6 to that shown in Fig. 8, while switch 32 is closed twice as the head returns from the position shown in Fig. 8 to that shown in Fig. 6.

In operation, assuming the landing gear A to be actuated or down the airplane accelerates and completes its take-off from the ground and finally gains such speed that the air pressure introduced into the case 45ª through tube 57ª is sufficient to move the head 49ª rearwardly against spring 82 in such manner as to cause switch 33 to be closed. The closing of switch 33 acts as above described to energize solenoid 30 with the result that valve 21 is positioned to cause lifting of the gear A. As the speed of the aircraft continues to accelerate the head 49ª will be moved rearwardly until the second cam projection 71ᵇ actuates or closes switch 33. By thus actuating switch 33 twice proper operation of the system is assured.

As the aircraft continues at flying speed or at high speed the head 49ª is maintained in a position such as is shown in Fig. 8. As speed is reduced for landing and before it reaches landing speed the spring 82 moves the head 49ª forward and finally returns the head 49ª to the position shown in Fig. 6 during which operation switch 32 is closed twice thus assuring operation of the system so that control valve 21 is positioned to effect lowering of the landing gear A.

In the form of the invention shown in Fig. 9, the head 49b, instead of being in the form of a piston sliding in case 45b, is loose in the case 45b and is sealed therewith by a diaphragm 90. In all other particulars the mechanism as shown in Fig. 9 may be identical with that shown in Figs. 5 to 8 inclusive.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A control for a reversible actuator of a landing gear of an airplane including, an electric system having two separate control switches governing the actuation and the direction of operation of the actuator, rotary cam means in operating engagement with the switch and operating the said switches simultaneously and oppositely so one opens when the other closes, and a rotatable pneumatic operator connected to and positively operating the cam means.

2. A control for a reversible actuator of a landing gear of an airplane including, an electric system having two separate control switches governing the actuation and the direction of operation of the actuator, reciprocating cam means engaged with and operating the said switches simultaneously and oppositely so one opens when the other closes, and a pneumatic operator connected to and positively operating the cam means.

3. A control for a reversible actuator of a landing gear of an airplane including, an electric system having two separate control switches governing the actuation and the direction of operation of the actuator, cam means engaging and operating the switches, and a reciprocating pneumatic operator in driving engagement with the cam means and responsive to air pressure resulting from flight of the airplane.

4. A control for the valve of a hydraulic landing gear actuator including, solenoids for operating the valve, solenoid switches controlling the solenoids, a manual switch for controlling the solenoids, a selector putting the solenoids under control of either the solenoid switches or the manual switch, cam means for operating the solenoid switches and a pneumatic operator for the cam means.

5. A control for a reversible actuator of a landing gear of an airplane including, an electric system having two switches governing actuation and the direction of operation of the actuator, cam means engaging and operating the said switches, and a pneumatic operator in driving engagement with the cam means including a stationary case, a cam operating member operating in the case, and an air tube receiving air as the airplane advances and delivering it into the case to act on and move said member.

6. A control for a reversible actuator of a landing gear of an airplane including, an electric system having two separate switches governing the actuation and the direction of operation of the actuator, cam means engaged with and operating the said switches simultaneously and oppositely, and a pneumatic operator having driving engagement with the cam means including a stationary case, a rotor operating in and relative to the case and driving the cam means.

7. A control for a reversible actuator of a landing gear of an airplane including, an electric system having two oppositely acting switches governing actuation and the direction of operation of the actuator, cam means engaging and operating the said switches, and a pneumatic operator driving the cam means including a member directly coupled to the cam means, means normally yieldingly holding said member in an unactuated position, and an air tube delivering air to said member whereby it is operated.

8. A control for a reversible actuator of a landing gear of an airplane including, an electric system having two oppositely acting switches governing actuation and the direction of operation of the actuator, cam means engaging and operating the switches, and a pneumatic operator driving the cam means including a member directly coupled to the cam means, spring means normally yieldingly holding said member in an unactuated position, and an air tube delivering air to said member whereby it is operated.

9. A control for a reversible actuator of a landing gear of an airplane including, an electric system having two oppositely acting switches governing actuation and the direction of operation of the actuator, cam means engaging and operating the switches, and a pneumatic operator for the cam means including a member in driving engagement with the cam means, gravity actuated means normally yieldingly holding said member in an unactuated position, and an air tube delivering air to said member whereby it is operated.

10. A control for a reversible actuator of a landing gear of an airplane including, an electric system having two oppositely acting switches governing actuation and the operation of the actuator, cam means engaging and operating the said switches, and a pneumatic operator driving the cam means including a rotating member actuating the cam means, gravity actuated means normally yieldingly holding said member in an unactuated position, and an air tube delivering air to said member whereby it is operated.

11. A control for a reversible actuator of a landing gear of an airplane including, an electric system having two oppositely acting control switches governing actuation and the operation of the actuator, cam means engaging and operating the switches, and a pneumatic operator in driving engagement with the cam means including a reciprocating member connected to the cam means, spring means normally yieldingly holding said member in an unactuated position, and an air tube delivering air to said member whereby it is operated.

JACK F. HAVERLIN.

References Cited in the file of this patent

UNITED STATES PATENTS

| Number | Name | Date |
| --- | --- | --- |
| 738,333 | Lancaster | Sept. 8, 1903 |
| 775,665 | Scott | Nov. 22, 1904 |
| 1,401,887 | Davis | Dec. 27, 1921 |
| 1,633,521 | Edwards | June 21, 1927 |
| 1,829,837 | Brown | Nov. 3, 1931 |
| 1,897,285 | Veit | Feb. 14, 1933 |
| 2,058,553 | Beiderman | Oct. 27, 1936 |
| 2,112,253 | Smith | Mar. 29, 1938 |
| 2,315,185 | Boyle | Mar. 30, 1943 |
| 2,401,097 | Parilla | May 28, 1946 |
| 2,418,508 | Goepfrich | Apr. 8, 1947 |